United States Patent
Kwon et al.

(10) Patent No.: US 11,211,181 B2
(45) Date of Patent: Dec. 28, 2021

(54) DIELECTRIC CERAMIC COMPOSITION AND MULTILAYER CERAMIC CAPACITOR COMPRISING THE SAME

(71) Applicant: SAMSUNG ELECTRO-MECHANICS CO., LTD., Suwon-si (KR)

(72) Inventors: Hyung Soon Kwon, Suwon-si (KR); Jae Sung Park, Suwon-si (KR); Min Young Choi, Suwon-si (KR); Ki Myoung Yun, Suwon-si (KR); Hyoung Uk Kim, Suwon-si (KR); Tae Young Ham, Suwon-si (KR); Seung In Baik, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 100 days.

(21) Appl. No.: 16/458,751

(22) Filed: Jul. 1, 2019

(65) Prior Publication Data
US 2020/0251242 A1  Aug. 6, 2020

(30) Foreign Application Priority Data

Feb. 1, 2019 (KR) .................. 10-2019-0013948
Mar. 25, 2019 (KR) .................. 10-2019-0033361

(51) Int. Cl.
*H01B 3/12* (2006.01)
*H01G 4/12* (2006.01)
(Continued)

(52) U.S. Cl.
CPC ............ *H01B 3/12* (2013.01); *C04B 35/4682* (2013.01); *H01G 4/012* (2013.01); *H01G 4/1227* (2013.01);
(Continued)

(58) Field of Classification Search
CPC .................. H01B 3/12; C04B 35/4682; C04B 2235/3206; C04B 2235/3208;
(Continued)

(56) References Cited

U.S. PATENT DOCUMENTS

| | | |
|---|---|---|
| 5,835,340 A | 11/1998 | Wada et al. |
| 5,877,934 A | 3/1999 | Sano et al. |

(Continued)

FOREIGN PATENT DOCUMENTS

| | | |
|---|---|---|
| JP | H10-172856 A | 6/1998 |
| JP | H10-223471 A | 8/1998 |

(Continued)

OTHER PUBLICATIONS

Office Action issued in corresponding Korean Patent Application No. 10-2019-0033361 dated Jun. 9, 2020, with English translation.

*Primary Examiner* — Michael P McFadden
(74) *Attorney, Agent, or Firm* — Morgan, Lewis & Bockius LLP

(57) ABSTRACT

A dielectric ceramic composition and a multilayer ceramic capacitor comprising the same includes a barium titanate ($BaTiO_3$)-based base material main ingredient and an accessory ingredient, and the accessory ingredient includes a third trivalent lanthanide rare earth element A and terbium (Tb) as rare earth elements, and a molar ratio (Tb/A) of a content of terbium (Tb) to the content of the trivalent lanthanide rare earth element A satisfies $0.15 \leq Tb/A < 0.50$.

18 Claims, 3 Drawing Sheets

(51) Int. Cl.
*H01G 4/012* (2006.01)
*C04B 35/468* (2006.01)
*H01G 4/30* (2006.01)
*H01G 4/232* (2006.01)

(52) U.S. Cl.
CPC ............... *C04B 2235/3206* (2013.01); *C04B 2235/3208* (2013.01); *C04B 2235/3215* (2013.01); *C04B 2235/3224* (2013.01); *C04B 2235/3236* (2013.01); *C04B 2235/3463* (2013.01); *H01G 4/232* (2013.01); *H01G 4/30* (2013.01)

(58) Field of Classification Search
CPC .... C04B 2235/3215; C04B 2235/3224; C04B 2235/3236; C04B 2235/3463; H01G 4/012; H01G 4/1227; H01G 4/232; H01G 4/30; H01G 4/2325; H01G 4/1209; H01G 4/228; H01G 4/306
See application file for complete search history.

(56) References Cited

U.S. PATENT DOCUMENTS

| | | | |
|---|---|---|---|
| 5,995,360 | A | 11/1999 | Hata et al. |
| 9,928,960 | B2 | 3/2018 | Nakanishi et al. |
| 2009/0086407 | A1 | 4/2009 | Takahashi et al. |
| 2009/0310279 | A1* | 12/2009 | Sasabayashi ....... C04B 35/4682 361/321.4 |
| 2015/0287535 | A1* | 10/2015 | Nakanishi ............ H01G 4/1245 361/301.4 |
| 2017/0178812 | A1* | 6/2017 | Shimada ................ H01G 4/248 |
| 2019/0131076 | A1* | 5/2019 | Fukumura ............ H01G 4/2325 |

FOREIGN PATENT DOCUMENTS

| | | |
|---|---|---|
| JP | 2009-203089 A | 9/2009 |
| KR | 10-1998-0009197 A | 4/1998 |

* cited by examiner

DIELECTRIC CERAMIC COMPOSITION AND MULTILAYER CERAMIC CAPACITOR COMPRISING THE SAME

CROSS-REFERENCE TO RELATED APPLICATION(S)

This application claims benefit of priority to Korean Patent Application Nos. 10-2019-0013948 filed on Feb. 1, 2019 in the Korean Intellectual Property Office, 10-2019-0033361 filed on Mar. 25, 2019 in the Korean Intellectual Property Office, the disclosure of which is incorporated herein by reference in its entirety.

BACKGROUND

1. Field

The present disclosure relates to a dielectric ceramic composition capable of improving reliability and a multilayer ceramic capacitor comprising the same.

2. Description of Related Art

Generally, electronic components using ceramic materials such as capacitors, inductors, piezoelectric devices, varistors, thermistors, or the like, may include a ceramic body formed of a ceramic material, internal electrodes disposed inside the body, and external electrodes disposed on a surface of the ceramic body so as to be connected to the internal electrodes.

Recently, while electronic products have been designed to have reduced sizes and multiple functions, chip components have also been reduced in size and have had a variety of functions implemented therein. Accordingly, there has been demand for a multilayer ceramic capacitor having a reduced size and high capacitance.

To simultaneously implement a multilayer ceramic capacitor having a reduced size and high capacitance, thicknesses of internal dielectric layers and electrode layers may need to be reduced such that an increased number of the internal dielectric layers and electrode layers may be stacked. Generally, a thickness of a dielectric layer is around 0.6 μm, and techniques to further decease a thickness of a dielectric layer have been continuously developed.

In this situation, securing reliability of the dielectric layer is a major issue of a dielectric material. Further, as the defect of degradation insulation resistance of a dielectric material has increased, there have been difficulties in managing product quality and yield.

To address the above issue, it has been necessary to secure high reliability in relation to a structural aspect of a multilayer ceramic capacitor and also a compositional aspect of a dielectric material.

If a dielectric composition, which may improve reliability at a current level one step further, is secured, a size of a multilayer ceramic capacitor may be reduced further than before.

SUMMARY

An aspect of the present disclosure is to provide a dielectric ceramic composition and a multilayer ceramic capacitor comprising the same which may improve reliability.

According to an aspect of the present disclosure, a dielectric ceramic composition includes a barium titanate (Ba-TiO$_3$)-based base material main ingredient and an accessory ingredient. The accessory ingredient includes a trivalent lanthanide rare earth element A and terbium (Tb) as rare earth elements, and a molar ratio (Tb/A) of the content of terbium (Tb) to a content of the trivalent lanthanide rare earth element A satisfies 0.15≤Tb/A<0.50.

According to an aspect of the present disclosure, a multilayer ceramic capacitor includes a ceramic body including a dielectric layer, and a first internal electrode and a second internal electrode disposed to oppose each other with the dielectric layer interposed therebetween; and a first external electrode electrically connected to the first internal electrode and a second external electrode electrically connected to the second internal electrode, which are disposed on an external surface of the ceramic body. The dielectric layer includes a dielectric ceramic composition, the dielectric ceramic composition includes a barium titanate (BaTiO$_3$)-based base material main ingredient and an accessory ingredient, and the accessory ingredient includes a trivalent lanthanide rare earth element A and terbium (Tb) as rare earth elements, and a molar ratio (Tb/A) of the content of terbium (Tb) to a content of the trivalent lanthanide rare earth element A satisfies 0.15≤Tb/A<0.50.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
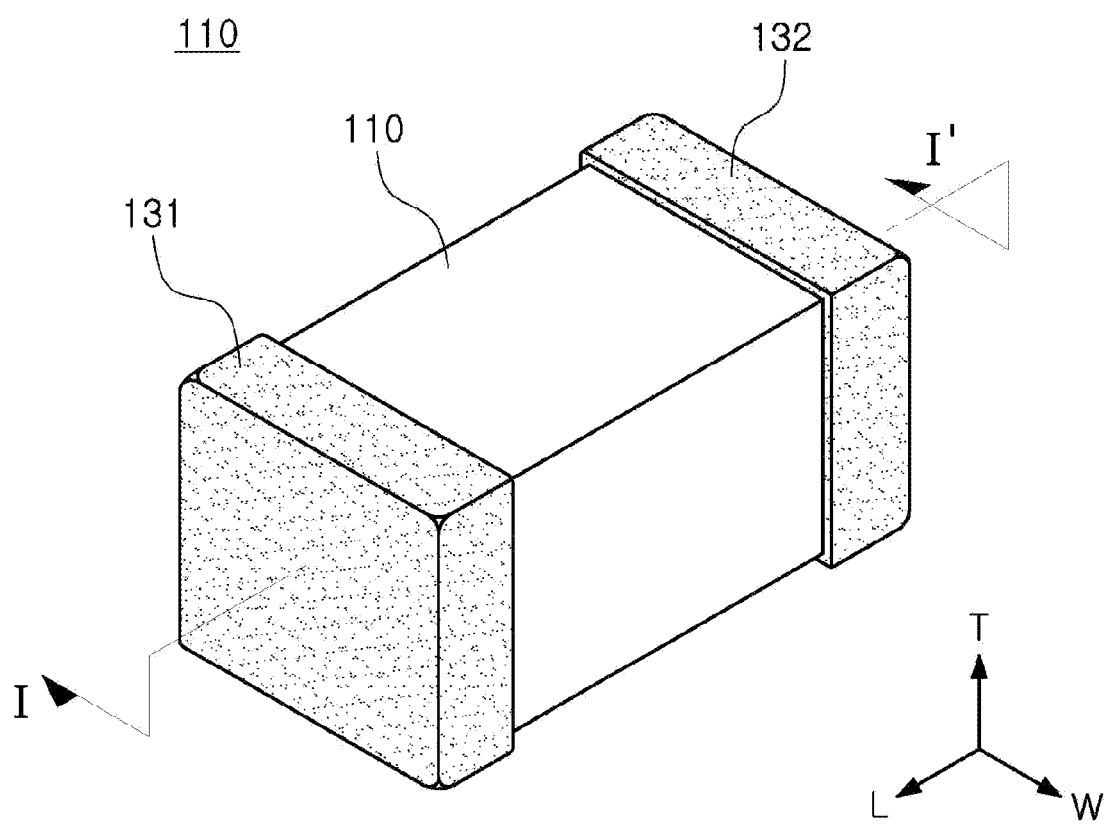
FIG. 1 is a schematic perspective view illustrating a multilayer ceramic capacitor according to an example embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are same elements in the drawings.

FIG. 1 is a schematic perspective view illustrating a multilayer ceramic capacitor according to an example embodiment of the present disclosure.

Figure 2:
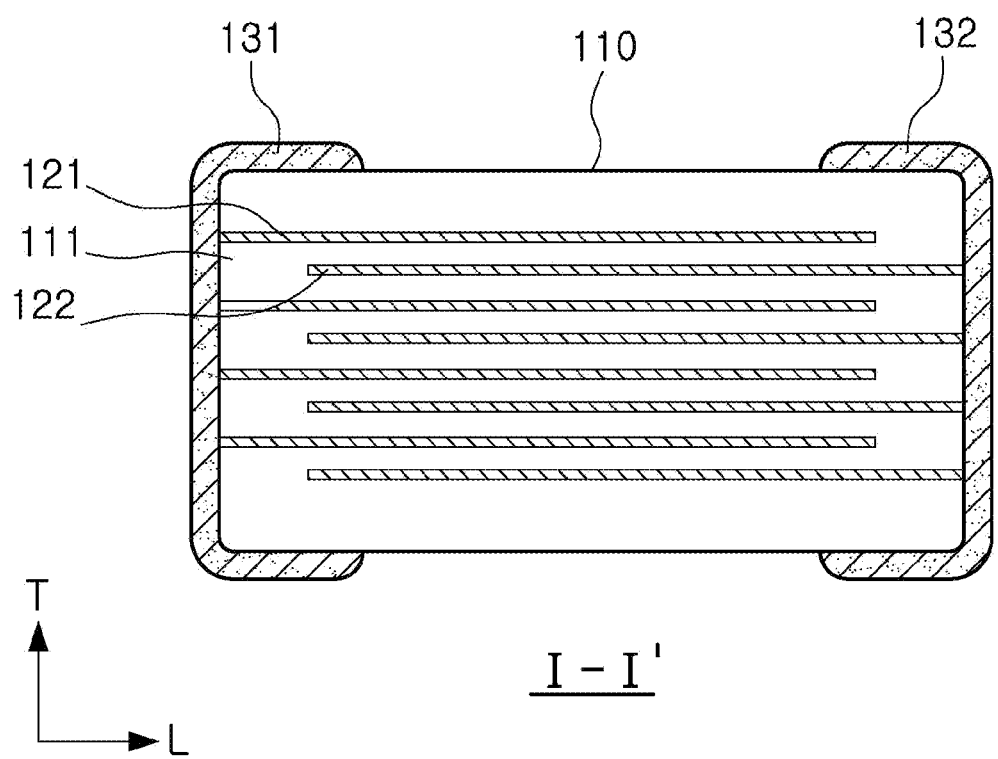
FIG. 2 is a cross-sectional view taken along line I-I' of FIG. 1.

FIG. 2 is a cross-sectional view taken along line I-I' of FIG. 1.

Referring to FIGS. 1 to 2, a multilayer ceramic capacitor 100 according to an embodiment of the present disclosure may include: a ceramic body 110 including a dielectric layer 111 and a first internal electrode 121 and a second internal electrode 122 disposed to oppose each other with the dielectric layer 111 interposed therebetween, and a first external electrode 131 electrically connected to the first internal electrode 121 and a second external electrode 132 electrically connected to the second internal electrode 122, which are disposed on an external surface of the ceramic body 110.

In the multilayer ceramic capacitor 100 in an embodiment of the present disclosure, "a length direction" is an L direction, "a width direction" is a W direction, and "a thickness direction" is a T direction, illustrated in FIG. 1. Here, the thickness direction may be the same as a stacking direction in which the dielectric layers are stacked.

A shape of the ceramic body 110 is not limited to any particular shape. For example, the ceramic body 110 may have a rectangular parallelepiped shape as illustrated.

A plurality of internal electrodes 121 and 122 formed in the ceramic body 110 may be configured such that one ends of the plurality of internal electrodes 121 and 122 may be exposed to one surface of the ceramic body 110 or to the other surface opposing the one surface of the ceramic body 110.

With regard to the internal electrodes 121 and 122, the first internal electrode 121 and the second internal electrode 122 having different polarities may be configured to be one pair.

One end of the first internal electrode 121 may be exposed to one surface of the ceramic body, and one end of the second internal electrode 122 may be exposed to the other surface opposing the one surface.

The first and second external electrodes 131 and 132 may be formed on one surface of the ceramic body 110 and on the other surface opposing the one surface, and may be electrically connected to the internal electrodes.

A material forming the first and second internal electrodes 121 and 122 is not limited to any particular material. For example, a material of the first and second internal electrodes 121 and 122 may be formed using a conductive paste including one or more elements among silver (Ag), lead (Pb), platinum (Pt), nickel (Ni), and copper (Cu).

The first and second external electrodes 131 and 132 may be electrically connected to the first and second internal electrodes 121 and 122 to form capacitance, and the second external electrode 132 may be connected to a potential different from a potential of the first external electrode 131.

A conductive material included in the first and second external electrodes 131 and 132 is not limited to any particular material. However, nickel (Ni), copper (Cu), or alloys thereof may be used as the conductive material.

Thicknesses of the first and second external electrodes 131 and 132 may be properly determined depending on use, and the like, and are not limited to any particular sizes. For example, the thicknesses may be within a range of 10 μm to 50 μm.

According to an embodiment of the present disclosure, a material of the dielectric layer 111 is not limited to any particular material as long as sufficient capacitance may be obtained therewith. For example, the material may be a barium titanate ($BaTiO_3$) powder.

As a material of the dielectric layer 111, various additives, organic solvents, plasticizers, coupling agents, dispersing agents, and the like, may be added to a barium titanate ($BaTiO_3$) powder depending on an intended purpose.

The dielectric layer 111 may be in a sintered state, and the dielectric layers 111 may be integrated with each other such that it may be difficult to identify boundaries between adjacent dielectric layers 111 with the naked eye.

The first and second internal electrodes 121 and 122 may be formed on the dielectric layer 111, and the internal electrodes 121 and 122 may be formed in the ceramic body with a single dielectric layer interposed therebetween through a sintering process.

A thickness of the dielectric layer 111 may vary in accordance with a capacitance design of a capacitor. In the embodiment of the present disclosure, a thickness of the single dielectric layer after a sintering process may be 0.45 μm or less, preferably.

In addition, thicknesses of the single first internal electrodes 121 and the single second internal electrode 122 each after a sintering process may be 0.45 μm or less, preferably.

According to an embodiment of the present disclosure, the dielectric layer 111 may include a dielectric ceramic composition. The dielectric ceramic composition may include a $BaTiO_3$-based base material main ingredient and an accessory ingredient. The accessory ingredient may include a trivalent lanthanide rare earth element A and terbium (Tb) as rare earth elements, and a molar ratio (Tb/A) of the content of terbium (Tb) to a content of the trivalent lanthanide rare earth element A satisfies $0.15 \leq Tb/A < 0.50$.

In particular, the trivalent lanthanide rare earth element A may be dysprosium (Dy).

According to an embodiment of the present disclosure, the molar ratio (Tb/A) of the content of terbium (Tb) to the content of the trivalent lanthanide rare earth element A satisfies $0.15 \leq Tb/A < 0.50$. In one embodiment, the molar ratio (Tb/A) of the content of terbium (Tb) to the content of the trivalent lanthanide rare earth element A ma be 0.20 or more, 0.25 or more, 0.30 or more, 0.35 or more, 0.40 or more, or 0.45 or more. In one embodiment, the molar ratio (Tb/A) of the content of terbium (Tb) to the content of the trivalent lanthanide rare earth element A may be 0.45 or less, 0.35 or less, 0.30 or less, 0.25 or less, or 0.20 or less.

When the molar ratio (Tb/A) of the content of terbium (Tb) to the content of the trivalent lanthanide rare earth element A satisfies $0.15 \leq Tb/A < 0.50$, a reliability improvement effect such as insulation resistance improvement, or the like is excellent.

In particular, the trivalent lanthanide rare earth element A may be dysprosium (Dy), and when the molar ratio (Tb/Dy) of the content of terbium (Tb) to the content of the dysprosium (Dy) satisfies $0.15 \leq Tb/Dy < 0.50$, the reliability improvement effect such as insulation resistance improvement, or the like is excellent.

According to an embodiment of the present disclosure, a dielectric ceramic composition including a dielectric layer in a ceramic body includes a trivalent lanthanide rare earth element A and terbium (Tb) as rare earth elements, as an accessory ingredient, and it is possible to improve reliability such as the insulation resistance improvement, or the like, by controlling the content of terbium (Tb) to the trivalent lanthanide rare earth element A.

When the molar ratio (Tb/A) of the content of terbium (Tb) to the content of the trivalent lanthanide rare earth element A is less than 0.15, an reliability improvement effect according to the addition of the terbium (Tb) may be insignificant, and when the molar ratio of the content of terbium (Tb) to the content of the trivalent lanthanide rare earth element A is 0, that is, when the terbium (Tb) is not added, such as the case in the related art, there may be no reliability improvement effect, such that defect rates may increase.

When the molar ratio (Tb/A) of the content of terbium (Tb) to the content of the trivalent lanthanide rare earth element A is 0.50 or more, insulation resistance may be lowered due to semiconductorization.

The trivalent lanthanide rare earth element A may be dysprosium (Dy). When the molar ratio (Tb/Dy) of the content of terbium (Tb) to the content of the dysprosium (Dy) is less than 0.15, the reliability improvement effect may be insignificant, and when the molar ratio of the content of terbium (Tb) to the content of the dysprosium (Dy) is 0, that is, when the terbium (Tb) is not added as in the case in the related art, there may be no reliability improvement effect, such that the defect rates may increase.

In addition, when the molar ratio (Tb/Dy) of the content of terbium (Tb) to the content of the dysprosium (Dy) is 0.5 or more, the insulation resistance may be lowered due to semiconductorization.

According to an embodiment of the present disclosure, a sum of the content of the trivalent lanthanide rare earth element A and the content of terbium (Tb) may be 0.2 mol % or more and 1.5 mol % or less, based on 100 mol % of titanium (Ti) of the base material main ingredient. In one embodiment, the sum of the content of the trivalent lanthanide rare earth element A and the content of the terbium (Tb) may be 0.3 mol %, 0.4 mol %, 0.5 mol %, 0.6 mol %, 0.7 mol %, 0.8 mol %, 0.9 mol %, 1.0 mol %, 1.1 mol %, 1.2 mol %, 1.3 mol % or 1.4 mol %.

In particular, the trivalent lanthanide rare earth element A may be dysprosium (Dy).

Generally, many rare earth elements are added in order to secure the reliability of the dielectric inside the multilayer ceramic capacitor.

It has been known that the rare earth elements, such as dysprosium (Dy), may reduce concentration of oxygen vacancies by substituting for Ba-site of barium titanate ($BaTiO_3$), a base material main ingredient, such that reliability may improve.

Meanwhile, a rare earth element having a larger ionic radius than dysprosium (Dy), for example, lanthanum (La), samarium (Sm), or the like is used, it is more effective for reducing concentration of oxygen vacancy defects, but there was a problem that the insulation resistance is drastically lowered due to excessive semiconductorization, thus, it has not been practically applied.

Therefore, it has been considered that it is better to apply a rare earth element having a larger ionic radius than dysprosium (Dy), but being not much different in size from dysprosium (Dy), in order to significantly reduce the concentration of oxygen vacancy defects to improve reliability and also to suppress the semiconductorization to secure the insulation resistance.

In addition, since a valence of general rare earth elements have a fixed valence of +3, when substituting Ba (+2), they have a single positive charge $D^{\bullet}_{Ba}$, but when a valence may have a multi-valence of +4 such as terbium (Tb), they have a double positive charge $D^{\bullet\bullet}_{Ba}$, such that an effect of decreasing oxygen vacancy defects may be two.

On the contrary, in the case of having a multi-valence of +3 such as ytterbium (Yb), when substituting Ba(+2), since it is charge-neutral, it may not be effective for decreasing the concentration of the concentration of oxygen vacancy defects, and thus, it has been known that reliability may further be rather deteriorated when ytterbium (Yb) is added.

As a result, though an ionic radius is larger than that of dysprosium (Dy), a terbium (Tb) element having multiple-valence while not being semiconductorized enough to reduce the insulation resistance, is most effective for decreasing the concentration of oxygen vacancy defects, such that it is expected that the reliability of the dielectric in the multilayer ceramic capacitor may be greatly improved. Therefore, a dielectric ceramic composition having both dysprosium (Dy) and terbium (Tb) simultaneously was developed.

In the related art, attempts in which one or more of dysprosium (Dy), gadolinium (Gd) and terbium (Tb) as rare earth elements are added to the dielectric ceramic composition were made.

Even in this case, terbium (Tb) was merely listed as a rare earth element or added in a small amount without recognizing the above-mentioned effect of the terbium (Tb), and there is no specific study on the content of the added terbium (Tb) to improve reliability.

In an embodiment of the present disclosure, an optimum ratio in an addition content of dysprosium (Dy) and terbium (Tb) was searched, and a ratio excellent in terms of reliability improvement was able to found.

According to an embodiment of the present disclosure, by controlling a sum of the content of the trivalent lanthanide rare earth element A and the content of the terbium (Tb) to be 0.2 mol % or more and 1.5 mol % or less, based on 100 mol % of titanium (Ti) of the base material main ingredient, it is possible to improve reliability such as insulation resistance improvement, or the like.

When the trivalent lanthanide rare earth element A is dysprosium (Dy), the sum of the contents of the dysprosium (Dy) and the terbium (Tb) is 0.2 mol % or more and 1.5 mol % or less, based on 100 mol % of titanium (Ti) of the base material main ingredient.

By controlling the sum of the contents of dysprosium (Dy) and terbium (Tb) to be 0.2 mol % or more and 1.5 mol % or less, based on 100 mol % of titanium (Ti) of the base material main ingredient, reliability improvement such as insulation resistance improvement, or the like, may be possible.

As a total content of a rare earth increases, it may be advantageous in terms of reliability. However, since the temperature characteristic is greatly lowered as Case Temperature (Tc) moves to room temperature, it is preferable to control the sum of the contents of dysprosium (Dy) and terbium (Tb) to be 1.5 mol % or less, based on 100 mol % of titanium (Ti) of the base material main ingredient.

When the sum of the contents of dysprosium (Dy) and terbium (Tb) exceeds 1.5 mol %, based on 100 mol % of titanium (Ti) of the base material main ingredient, the temperature characteristics such as a temperature coefficient of capacitance (TCC) may be lowered.

On the other hand, when the sum of the contents of dysprosium (Dy) and terbium (Tb) is less than 0.2 mol %, based on 100 mol % of titanium (Ti) of the base material main ingredient, the reliability may be lowered.

A multilayer ceramic capacitor 100 according to an embodiment of the present disclosure is a very small and high-capacity product as described above. A thickness of the dielectric layer 111 may be 0.45 μm or less, and thicknesses of the first and second internal electrodes 121 and 122 may be 0.45 μm or less, but is not necessarily limited thereto.

That is, since the multilayer ceramic capacitor 100 according to an embodiment of the present disclosure is a very small and a high-capacity product, the thicknesses of the dielectric layer 111 and the first and second internal electrodes 121 and 122 are formed of thinner films than those of products in the related art. Thus, in the case of a product to which a thin film dielectric layer and an internal electrode are applied, a study for improving reliability such as insulation resistance, or the like, may be a significant issue.

That is, in the multilayer ceramic capacitor in the related art, since it has a relatively thicker thickness than the dielectric layer and the internal electrode included in the multilayer ceramic capacitor, even when the composition of the dielectric ceramic composition is the same as that of the dielectric ceramic composition in the related art, reliability was not a serious problem.

However, as in an embodiment of the present disclosure, in the product to which a thin film dielectric layer and an internal electrode are applied, the reliability of the multilayer ceramic capacitor. To this end, it is necessary to control the composition of the dielectric ceramic composition.

That is, in an embodiment of the present disclosure, by controlling the sum of the contents of the trivalent lanthanide rare earth element A and the terbium (Tb) to be 0.2 mol % or more and 1.5 mol % or less, based on 100 mol % of the titanium (Ti), and in particular, by controlling the molar ratio (Tb/A) of the content of terbium (Tb) to the content of the trivalent lanthanide rare earth element A to satisfy 0.15≤Tb/A<0.50, even in the case of the thin film having the thicknesses of the dielectric layer 111 and the first and second internal electrodes 121 and 122 of 0.45 μm or less, it is possible to improve reliability such as insulation resistance improvement, or the like.

However, a meaning of the thin film may not mean that the thicknesses of the dielectric layer 111 and the first and second internal electrodes 121 and 122 are 0.45 μm or less, and the meaning of the thin film may be understood as a concept including a dielectric layer and an internal electrode, thinner than the products in the related art.

Hereinafter, each ingredient of the dielectric ceramic composition according to an embodiment of the present disclosure will be described in more detail.

a) Base Material Main Ingredient

A dielectric ceramic composition according to an embodiment of the present disclosure may include a base material main ingredient represented by $BaTiO_3$.

According to an embodiment of the present disclosure, the base material main ingredient may include one or more elements selected from a group consisting of $BaTiO_3$, $(Ba_{1-x}Ca_x)(Ti_{1-y}Ca_y)O_3$ (where, x may satisfy 0≤x≤0.3, and y may satisfy 0≤y≤0.1), $(Ba_{1-x}Ca_x)(Ti_{1-y}Zr_y)O_3$ (where, x may satisfy 0≤x≤0.3, and y may satisfy 0≤y≤0.5), and $Ba(Ti_{1-y}Zr_y)O_3$ (where, y may satisfy 0<y≤0.5), but is not necessarily limited thereto.

The dielectric ceramic composition according to an embodiment of the present disclosure may have a dielectric constant of 2000 or more at room temperature.

The base material main ingredient is not limited to any particular example, and an average particle size of a main ingredient powder may be 40 nm or more and 150 nm or less.

b) First Accessory Ingredient

According to an embodiment of the present disclosure, the dielectric ceramic composition may necessarily include dysprosium (Dy) and terbium (Tb) as first accessory ingredient elements, and may further include 0.0 to 4.0 mol % of a first accessory ingredient, oxides or carbonates including at least one element selected from the group consisting of yttrium (Y), holmium (Ho), erbium (Er), cerium (Ce), neodymium (Nd), promethium (Pm), europium (Eu), terbium (Tb), thulium (Tm), ytterbium (Yb), lutetium (Lu) and samarium (Sm) as the first accessory ingredient elements, based on 100 mol % of the base material main ingredient. In one embodiment, the content of the oxides or carbonates including at least one element selected from the group consisting of Y, Ho, Er, Ce, Nd, Pm, Eu, Tb, Tm, Yb, Lu and Sm as the first accessory ingredient elements may be at least more than 0.0 mol %, 0.1 mol % or more, 0.5 mol % or more, 1.0 mol % or more, 1.5 mol % or more, 2.0 mol % or more, 2.5 mol % or more, 3.0 mol % or more, or 3.5 mol % or more. In one embodiment, the content of the oxides or carbonates including at least one element selected from the group consisting of Y, Ho, Er, Ce, Nd, Pm, Eu, Tb, Tm, Yb, Lu and Sm as the first accessory ingredient elements may be 3.5 mol % or less, 3.0 mol % or less, 2.5 mol % or less, 2.0 mol % or less, 1.5 mol % or less, 1.0 mol % or less, or 0.5 mol % or less.

The first accessory ingredient may serve to prevent reliability degradation of the multilayer ceramic capacitor to which the dielectric ceramic composition is applied in an embodiment of the present disclosure.

When the content of the first accessory ingredient exceeds 4.0 mol %, reliability may be lowered, the dielectric constant of the dielectric ceramic composition may be lowered, or high-temperature withstand voltage characteristics may be deteriorated.

According to an embodiment of the present disclosure, the molar ratio (Tb/Dy) of the content of terbium (Tb) to the content of the dysprosium (Dy) may satisfy 0.15≤Tb/Dy<0.50.

It is possible to improve the reliability such as insulation improvement, or the like, by controlling the molar ratio (Tb/Dy) of the content of terbium (Tb) to the content of the dysprosium (Dy) to satisfy 0.15≤Tb/Dy<0.50.

When the molar ratio (Tb/Dy) of the content of terbium (Tb) to the content of the dysprosium (Dy) is less than 0.15, an effect for reliability improvement according to addition of the terbium (Tb) may be insignificant, and when the content of the terbium (Tb) to the content of the dysprosium (Dy) is 0, that is, when the terbium (Tb) is not added as in the related art, there is no effect for reliability improvement, such that the defect rate may increase.

When the molar ratio (Tb/Dy) of the content of terbium (Tb) to the content of the dysprosium (Dy) is 0.50 or more, insulation resistance may be deteriorated due to semiconductorization.

In addition, when the sum of the contents of the dysprosium (Dy) and terbium (Tb) may be 0.2 mol % or more and 1.5 mol % or less, based on 100 mol % of titanium (Ti) of the base material main ingredient.

It is possible to improve reliability such as insulation resistance improvement, or the like, by controlling the sum of the contents of dysprosium (Dy) and terbium (Tb) to be 0.2 mol % or more and 1.5 mol % or less, based on 100 mol % of titanium (Ti) of the base material main ingredient.

c) Second Accessory Ingredient

According to an embodiment of the present disclosure, the dielectric ceramic composition may include oxides or carbonates including at least one or more elements among Mn, V, Cr, Fe, Ni, Co, Cu and Zn as a second accessory ingredient.

As the second accessory ingredient, a content of oxides or carbonates including at least one or more selected from the group consisting of manganese (Mn), vanadium (V), chromium (Cr), iron (Fe), nickel (Ni), cobalt (Co), copper (Cu) and zinc (Zn) may be 0.1 to 2.0 mol %, based on 100 mol % of the base material powder. In one embodiment, the content of the oxides or carbonates including at least one or more elements selected from the group consisting of Mn, V, Cr, Fe, Ni, Co, Cu and Zn as the second accessory ingredient elements may be 0.2 mol % or more, 0.4 mol % or more, 0.6 mol % or more, 0.8 mol % or more, 1.0 mol % or more, 1.2 mol % or more, 1.4 mol % or more, 1.6 mol % or more, or 1.8 mol % or more. In one embodiment, the content of the oxides or carbonates including at least one or more elements selected from the group consisting of Mn, V, Cr, Fe, Ni, Co, Cu and Zn as the second accessory ingredient elements may be 1.8 mol % or less, 1.6 mol % or less, 1.4 mol % or less, 1.2 mol % or less, 1.0 mol % or less, 0.8 mol % or less, 0.6 mol % or less, 0.4 mol % or less, or 0.2 mol % or less.

The second accessory ingredient may serve to reduce a sintering temperature and improving high-temperature withstand voltage characteristics of the multilayer ceramic capacitor to which the dielectric ceramic composition is applied.

A content of the second accessory ingredient and contents of third to sixth accessory ingredients, to be described later may be based on 100 mol % of the base material powder, and in particular, may be defined as a mol % of a metal ion included in each of the accessory ingredients.

When the content of the second accessory ingredient is less than 0.1 mol %, a sintering temperature may increase, and high-temperature withstand characteristics may be somewhat lowered.

When the content of the second accessory ingredient is 2.0 mol % or more, high-temperature withstand voltage characteristics and room temperature resistivity may be lowered.

In particular, the dielectric ceramic composition according to an embodiment of the present disclosure may include a second accessory ingredient having a content of 0.1 to 2.0 mol %, based on 100 mol % of the base material main ingredient, and accordingly, a low-temperature sintering process may be performed, and high-temperature withstand characteristics may be obtained.

d) Third Accessory Ingredient

According to an embodiment of the present disclosure, the dielectric ceramic composition may include a third accessory ingredient, oxides or carbonates including a fixed-valence acceptor element magnesium (Mg).

The fixed-valence acceptor element Mg may include 0.0 to 0.5 mol % of the third accessory ingredient, based on 100 mol % of the base material main ingredient. In one embodiment, the content of the third accessory ingredient based on 100 mol % of the base material main ingredient may be at least more than 0.0 mol %, 0.1 mol % or more, 0.2 mol % or more, 0.3 mol % or more, or 0.4 mol % or more. In one embodiment, the content of the third accessory ingredient based on 100 mol % of the base material main ingredient may be 0.4 mol % or less, 0.3 mol % or less, or 0.2 mol % or less.

The third accessory ingredient may be a fixed-valence acceptor element and compounds including the same, and the third accessory ingredient may act as an acceptor to reduce concentration of electrons. The effect for improving reliability may be maximized due to n-typeization by adding 0.0 to 0.5 mol % of the third accessory ingredient.

When the content of the third accessory ingredient exceeds 0.5 mol %, based on 100 mol % of the base material powder, the dielectric constant may be lowered, which is not preferable.

However, according to an embodiment of the present disclosure, it is preferable to add 0.5 mol % of the third accessory ingredient, based on 100 mol % of titanium (Ti) in order to maximize the effect for improving reliability due to n-typeization, but is not necessarily limited thereto, may be added in a small amount in an amount of 0.5 mol % or less or 0.5 mol %.

e) Fourth Accessory Ingredient

According to an embodiment of the present disclosure, the dielectric ceramic composition may include a fourth accessory ingredient, oxides or carbonates including barium (Ba).

The dielectric ceramic composition may include 0.0 to 4.15 mol % of the fourth accessory ingredient, oxides or carbonates including Ba, based on 100 mol % of the base material main ingredient. In one embodiment, the content of the fourth accessory ingredient based on 100 mol % of the base material main ingredient may be at least more than 0.0 mol %, 0.1 mol % or more 0.5 mol % or more, 1.0 mol % or more, 1.5 mol % or more, 2.0 mol % or more, 2.5 mol % or more, 3.0 mol % or more, 3.5 mol % or more, or 4.0 mol % or more. In one embodiment, the content of the fourth accessory ingredient based on 100 mol % of the base material main ingredient may be 4.0 mol % or less, 3.5 mol % or less, 3.0 mol % or less, 2.5 mol % or less, 2.0 mol % or less, 1.5 mol % or less, 1.0 mol % or less, 0.5 mol % or less.

A content of the fourth accessory ingredient may be based on a content of Ba element included in the fourth accessory ingredient without distinguishing a form of addition such as oxides or carbonates.

The fourth accessory ingredient may serve to facilitate a sintering process, to control a dielectric constant, and the like, in the dielectric ceramic composition, and when a content of the fourth accessory ingredient exceeds 4.15 mol %, based on 100 mol % of the base material main ingredient, a dielectric constant may decrease or a sintering temperature may increase.

f) Fifth Accessory Ingredient

According to an embodiment of the present disclosure, the dielectric ceramic composition may include a fifth accessory ingredient including one or more elements selected from a ground consisting of oxides or carbonates including one or more elements selected from the group consisting of calcium (Ca) and zirconium (Zr).

The dielectric ceramic composition may include 0.0 to 20.0 mol % of the fifth accessory ingredient, oxides or carbonates including at least one selected from the group consisting of Ca and Zr, based on 100 mol % of the base material main ingredient. In one embodiment, the content of the fifth accessory ingredient based on 100 mol % of the base material main ingredient may be at least more than 0.0 mol %, 0.1 mol % or more, 0.5 mol % or more, 1.0 mol % or more, 2.5 mol % or more, 5.0 mol % or more, 10.0 mol % or more, or 15.0 mol % or more. In one embodiment, the content of the fifth accessory ingredient based on 100 mol % of the base material main ingredient may be 15.0 mol % or less, 10.0 mol % or less, 5.0 mol % or less, 2.5 mol % or less, 1.0 mol % or less, or 0.5 mol % or less.

A content of the fifth accessory ingredient may be based on a content of at least one or more elements between Ca and Zr included in the fifth accessory ingredient without distinguishing a form of addition such as oxides or carbonates.

The fifth accessory ingredient may form a core-shell structure in the dielectric ceramic composition and may serve to improve a dielectric constant and reliability. When the fifth accessory ingredient is included in 20.0 mol % or less, based on 100 mol % of the base material main ingredient, the dielectric ceramic composition implementing a relatively high dielectric constant and having improved high-temperature withstand voltage characteristics may be provided.

When a content of the fifth accessory ingredient exceeds 20.0 mol %, based on 100 mol % of the base material main ingredient, a room temperature dielectric constant may decrease, and high-temperature withstand voltage characteristics may be lowered.

g) Sixth Accessory Ingredient

According to an embodiment of the present disclosure, the dielectric ceramic composition may include oxides including at least one element selected from the group consisting of silicon (Si) and aluminum (Al), or glass compounds including Si as a sixth accessory ingredient.

The dielectric ceramic composition may further include 0.0 to 4.0 mol % of the sixth accessory ingredient, oxides including at least one element between Si and Al, or glass compounds including Si, based on 100 mol % of the base material main ingredient. In one embodiment, the content of the sixth accessory ingredient based on 100 mol % of the base material main ingredient may be at least more than 0.0 mol %, 0.1 mol % or more, 0.5 mol % or more, 1.5 mol % or more, 2.0 mol % or more, 2.5 mol % or more, 3.0 mol % or more, or 3.5 mol % or more. In one embodiment, the content of the sixth accessory ingredient based on 100 mol % of the base material main ingredient may be 3.5 mol % or less, 3.0 mol % or less, 2.5 mol % or less, 2.0 mol % or less, 1.5 mol % or less, 1.0 mol % or less, or 0.5 mol % or less.

A content of the sixth accessory ingredient may be based on a content of at least one or more elements between Si and Al included in the sixth accessory ingredient without distinguishing a form of addition such as glass, oxides or carbonates.

The sixth accessory ingredient may serve to decrease a sintering temperature and to improve high-temperature withstand voltage characteristics of the multilayer ceramic capacitor to which the dielectric ceramic composition is applied.

When a content of the sixth accessory ingredient exceeds 4.0 mol %, based on 100 mol % of the base material main ingredient, the problems of degradation of sintering characteristics and density, creation of a secondary phase, and the like, may occur, which is not preferable.

In particular, according to an embodiment of the present disclosure, as the dielectric ceramic composition includes 4.0 mol % or less of Al, grain growth may be uniformly controlled such that withstand voltage characteristics and reliability may be improved, and DC-bias may also be improved.

In the description below, the present disclosure will be described in greater detail with reference to an embodiment and a comparative example, and the embodiment is provided to help understanding of the present disclosure, and a scope of embodiments is not limited thereto.

Embodiment

In an embodiment, to form a dielectric layer, a dielectric slurry was prepared by adding additives such as Dy, Tb, Al, Mg, Mn, and the like, and an organic solvent such as binder and ethanol to a dielectric raw material powder including barium titanate ($BaTiO_3$) powder, and performing a wet mixing process, and thereafter, a ceramic green sheet was prepared by coating a surface of a carrier film with the dielectric slurry and drying the coated slurry, and a dielectric layer was formed.

In this case, contents of additives of overall elements were mono-dispersed and added in 40% or less compared to barium titanate.

In particular, a sum of the contents of dysprosium (Dy) and terbium (Tb) in the rare earth elements was 1.5 mol % or less, based on 100 mol % of titanium (Ti) of the base material main ingredient was included.

In embodiment 1, a sum of the contents of dysprosium (Dy) and terbium (Tb) was 1.5 mol % based on 100 mol % of titanium (Ti) of the base material main ingredient, and a molar ratio (Tb/Dy) of the content of terbium (Tb) to the content of dysprosium (Dy) was adjusted to be 0.15 or more and less than 0.5.

The ceramic green sheet having a thickness of several μm was prepared from a slurry including a mixture of ceramic powder, binder, and solvent by applying a doctor blade method to the slurry.

Next, an average size of a nickel particle was within a range of 0.1 to 0.2 μm, and a conductive paste for internal electrodes including nickel powder of 40 to 50 parts by weight was provided.

The green sheet was coated with the conductive paste for internal electrodes through a screen printing process, the green sheets on which an internal electrode pattern was disposed were stacked, and a laminate was formed. The laminate was compressed and cut out.

Thereafter, the binder was removed by heating the cut out laminate, the laminate was sintered in a high-temperature reducible atmosphere, thereby forming a ceramic body.

In the sintering process, a sintering process was performing for two hours at 1100 to 1200° C. in a reducible atmosphere (atmosphere of 0.1% $H_2$/99.9% $N_2$, $H_2O/H_2/N_2$), and a re-oxidation was performed for three hours in a nitrogen ($N_2$) atmosphere at 1000° C., and heat treatment was performed.

Next, a termination process and an electrode sintering process were performed on the sintered ceramic body using a copper (Cu) paste, and external electrodes were prepared.

In addition, thicknesses of the dielectric layer 111 and the first and second internal electrodes 121 and 122 in the ceramic body 110 were 0.45 μm or less after the sintering process.

Comparative Example 1

In comparative example 1, a sum of the contents of dysprosium (Dy) and terbium (Tb) was in an amount of 1.8 mol % based on 100 mol % of titanium (Ti) of the base material main ingredient, and other manufacturing processes were the same as the processes in the above-described embodiment.

Comparative Example 2

In comparative example 2, a sum of the contents of dysprosium (Dy) and terbium (Tb) was in an amount of 2.1 mol %, based on 100 mol % of titanium (Ti) of the base material main ingredient, and other manufacturing processes were the same as the processes in the above-described embodiment.

Comparative Example 3

In comparative example 3, only dysprosium (Dy) was added without adding terbium (Tb) as a dielectric magnetic composition in the related art, and other manufacturing processes were the same as the processes in the above-described embodiment.

Comparative Example 4

In comparative example 4, terbium (Tb) and dysprosium (Dy) were added in amounts such that a molar ratio (Tb/Dy) of the content of terbium (Tb) to the content of the dysprosium (Dy) became less than 0.1, and other manufacturing processes were the same as the processes in the above-described embodiment.

Comparative Example 5

In comparative example 5, terbium (Tb) and dysprosium (Dy) were added in amounts such that a molar ratio (Tb/Dy) of the content of terbium (Tb) to the content of dysprosium (Dy) became 0.5 or more, and other manufacturing processes were the same as the processes in the above-described embodiment.

A temperature characteristic and a highly accelerated life test (HALT) were performed to embodiments 1 and 2, specimens of a prototype multilayer ceramic capacitor (MLCC) manufactured as above, and to comparative examples 1 to 5 to access a defect rate.

Temperature coefficient of capacitance (TCC) was measured by the temperature characteristic, a X5R temperature characteristic standard should satisfy a capacitance of ±15% in a range of −55° C. to 85° C. based on a capacity of 25° C., and a X6S temperature characteristic standard should satisfy a capacitance of ±22% in a range of −55° C. to 105° C. based on a capacity of 25° C.

In the highly accelerated life test (HALT), forty multilayer ceramic capacitor chips were mounted on a substrate in each sample, and the defect rate was measured at 125° C. and under a voltage applying condition of 20 V (DC) for twelve hours.

Table 1 below shows the temperature characteristics of the proto-type multilayer ceramic capacitor (MLCC) chips in experimental examples (an embodiment 1 and comparative examples 1 and 2).

TABLE 1

| Temperature (° C.) | TCC (%) | | |
|---|---|---|---|
| | Embodiment 1 (Dy + Tb = 1.5 mol %) | Comparative example 1 (Dy + Tb = 1.8 mol %) | Comparative example 2 (Dy + Tb = 2.1 mol %) |
| −55 | −13.9 | −16.3 | −12.9 |
| −25 | −7.3 | −9.8 | −6.6 |
| 5 | −2.4 | −3.7 | −2 |
| 25 | 0 | 0 | 0 |
| 55 | 5.3 | 0.8 | −3.2 |
| 85 | −2.3 | −13.8 | −17.4 |
| 105 | −21.4 | −27.9 | −28.9 |

Referring to Table 1, in the case of comparative example 1 and comparative example 2, in which the sum of the contents of dysprosium (Dy) and terbium (Tb) exceeds 1.5 mol %, based on 100 mol % of titanium (Ti) of the base material main ingredient, it can be seen that not only the X5R temperature characteristic but also X5R characteristic are not satisfied.

On the other hand, Embodiment 1 of the present disclosure shows a case in which the sum of the contents of dysprosium (Dy) and terbium (Tb) is 1.5 mol % or less, based on 100 mol % of titanium (Ti) of the base material main ingredient. It can be seen that not only the X6S temperature characteristic but also the X5R temperature characteristic are satisfied and the reliability improvement is excellent.

Figure 3:
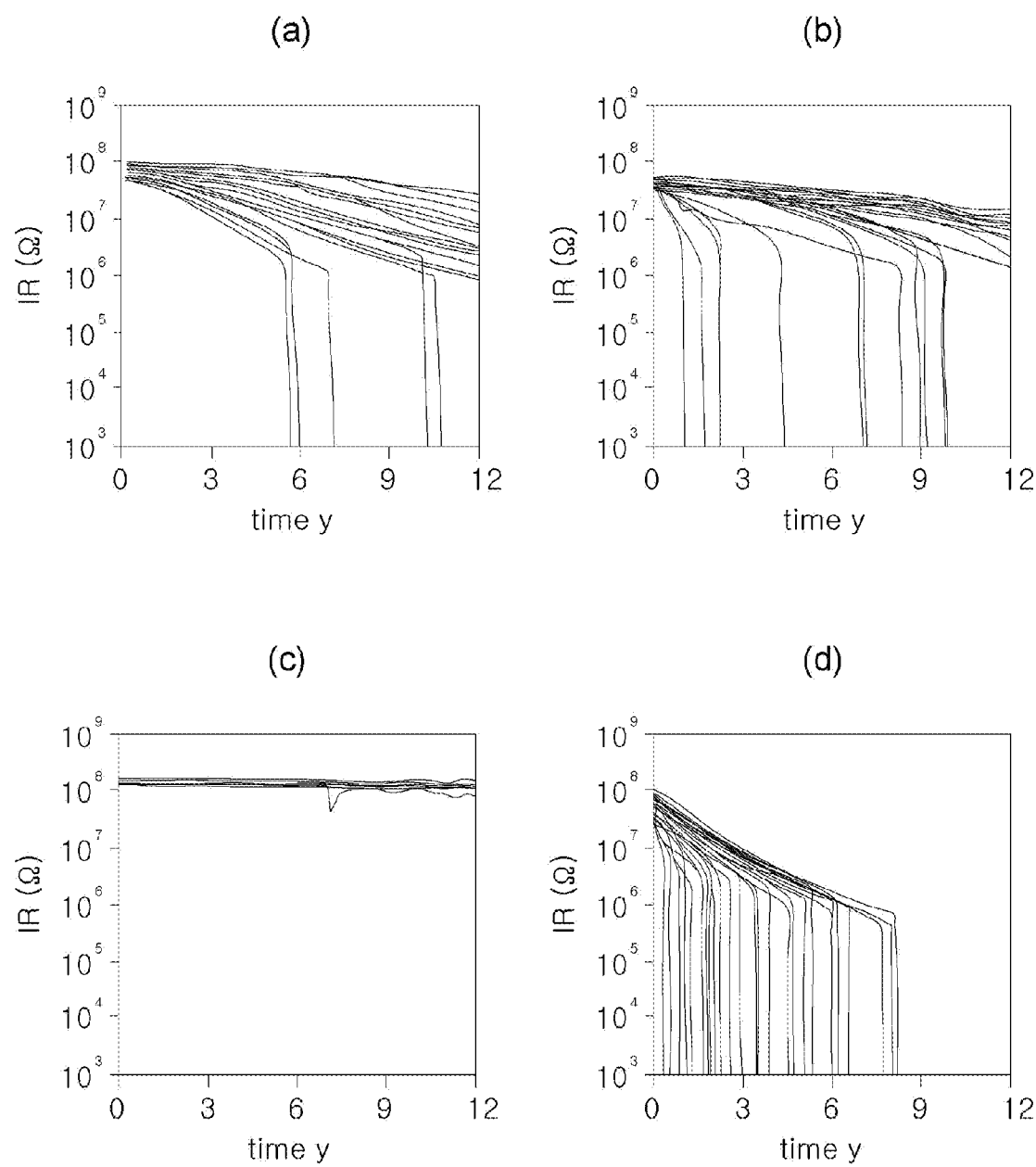
FIG. 3 is a graph illustrating results of harsh reliability evaluation according to an embodiment and a comparative example of the present disclosure.

FIG. 3 is a graph illustrating a result of a highly accelerated life test according to an embodiment and a comparative example of the present disclosure.

Referring to FIG. 3, in comparative example 3(a) of the present disclosure, it can be seen that a composition of the dielectric magnetic composition in the related art was prepared by adding only dysprosium (Dy), without adding terbium (Tb). The number of defects obtained by the highly accelerated life test was 5, which is relatively high.

In comparative example 4(b) of the present disclosure, a molar ratio (Tb/Dy) of the content of terbium (Tb) to the content of dysprosium (Dy) was added to be less than 0.15. The number of defects obtained by the highly accelerated life test was 9, which is relatively high.

This is because the content of the added terbium (Tb) to the content of the dysprosium (Dy) is small, such that an effect for improving reliability of the addition of the terbium (Tb) may be insignificant.

On the other hand, in Embodiment 2(c) of the present disclosure, the molar ratio (Tb/Dy) of the content of terbium (Tb) to the content of dysprosium (Dy) satisfies 0.15 or more and less than 0.5. The number of defects obtained by the highly accelerated life test was 0, which is relatively high. Thus, the reliability was improved.

Meanwhile, in comparative example 5(d) of the present disclosure, the molar ratio (Tb/Dy) of the content of terbium (Tb) to the content of dysprosium (Dy) was 0.5 or more, which almost all sampled are proved to be defective in reliability.

When the molar ratio (Tb/Dy) of the content of terbium (Tb) to the content of the dysprosium (Dy) is 0.50 or more, it is considered that the insulation resistance may be lowered due to semiconductorization.

As set forth, according to an embodiment of the present disclosure, a dielectric ceramic composition included in a dielectric layer in a ceramic body includes terbium (Tb), a new rare earth element, as an accessory element, and a content thereof may be controlled to improve reliability such as insulation resistance improvement, and the like.

While the example embodiments have been shown and described above, it will be apparent to those skilled in the art that modifications and variations could be made without departing from the scope of the present invention as defined by the appended claims.

What is claimed is:

1. A dielectric ceramic composition, comprising: a barium titanate-($BaTiO_3$) based base material main ingredient and an accessory ingredient, wherein the accessory ingredient includes a trivalent lanthanide rare earth element A and terbium (Tb) as rare earth elements, and wherein a molar ratio (Tb/A) of a content of terbium (Tb) to a content of the trivalent lanthanide rare earth element A satisfies 0.25<Tb/A<0.50; wherein the trivalent lanthanide rare earth element A is dysprosium (Dy).

2. The dielectric ceramic composition of claim 1, wherein a sum of the content of the trivalent lanthanide rare earth element A and the content of terbium (Tb) is 0.2 mol % or more and 1.5 mol % or less, based on 100 mol % of titanium (Ti) of a base material main ingredient.

3. The dielectric ceramic composition of claim 1, wherein the dielectric ceramic composition further comprises at least more than 0.0 to 4.0 mol % of a first accessory ingredient, oxides or carbonates including at least one element among Y, Ho, Er, Ce, Nd, Pm, Eu, Gd, Tm, Yb, Lu and Sm, based on 100 mol % of the base material main ingredient.

4. The dielectric ceramic composition of claim 1, wherein the dielectric ceramic composition comprises 0.1 to 2.0 mol % of a second accessory ingredient, oxides or carbonates including at least one element among Mn, V, Cr, Fe, Ni, Co, Cu, and Zn, based on 100 mol % of the base material main ingredient.

5. The dielectric ceramic composition of claim 1, wherein the dielectric ceramic composition comprises at least more than 0.0 to 0.5 mol % of a third accessory ingredient, oxides or carbonates including a fixed-valence acceptor element Mg, based on 100 mol % of titanium (Ti) of the base material main ingredient.

6. The dielectric ceramic composition of claim 1, wherein the dielectric ceramic composition comprises at least more than 0.0 to 4.15 mol % of a fourth accessory ingredient, oxides or carbonates including Ba, based on 100 mol % of the base material main ingredient.

7. The dielectric ceramic composition of claim 1, wherein the dielectric ceramic composition comprises at least more than 0.0 to 20.0 mol % of a fifth accessory ingredient, oxides or carbonates including at least one element between Ca and Zr, based on 100 mol % of the base material main ingredient.

8. The dielectric ceramic composition of claim 1, wherein the dielectric ceramic composition comprises at least more than 0.0 to 4.0 mol % of a sixth accessory ingredient, oxides including at least one element between Si and Al, or glass compounds including Si, based on 100 mol % of the base material main ingredient.

9. A multilayer ceramic capacitor, comprising: a ceramic body including a dielectric layer, and a first internal electrode and a second internal electrode disposed to oppose each other with the dielectric layer interposed therebetween; and a first external electrode electrically connected to the first internal electrode and a second external electrode electrically connected to the second internal electrode, which are disposed on an external surface of the ceramic body, wherein the dielectric layer includes a dielectric ceramic composition, wherein the dielectric ceramic composition includes a barium titanate (BaTiO3)-based base material main ingredient and an accessory ingredient, and the accessory ingredient includes a trivalent lanthanide element A and terbium (Tb) as rare earth elements, and wherein a molar ratio (Tb/A) of a content of terbium (Tb) to a content of the trivalent lanthanide rare earth element A satisfies 0.25<Tb/A<0.50; wherein the trivalent lanthanide rare earth element A is dysprosium (Dy).

10. The multilayer ceramic capacitor of claim 9, wherein a sum of the content of the trivalent lanthanide rare earth element A and the content of terbium (Tb) is 0.2 mol % or more and 1.5 mol % or less, based on 100 mol % of titanium (Ti) of a base material main ingredient.

11. The multilayer ceramic capacitor of claim 9, wherein the dielectric ceramic composition further comprises at least more than 0.0 to 4.0 mol % of a first accessory ingredient, oxides or carbonates including at least one element among Y, Ho, Er, Ce, Nd, Pm, Eu, Gd, Tm, Yb, Lu and Sm, based on 100 mol % of the base material main ingredient.

12. The multilayer ceramic capacitor of claim 9, wherein the dielectric ceramic composition comprises 0.1 to 2.0 mol % of a second accessory ingredient, oxides or carbonates including at least one element among Mn, V, Cr, Fe, Ni, Co, Cu, and Zn, based on 100 mol % of the base material main ingredient.

13. The multilayer ceramic capacitor of claim 9, wherein the dielectric ceramic composition comprises at least more than 0.0 to 0.5 mol % of a third accessory ingredient, oxides or carbonates including Ba, and includes at least more than 0.0 to 20.0 mol % of a fifth accessory ingredient, oxides or carbonates including a fixed-valence acceptor element Mg, based on 100 mol % of titanium (Ti) of the base material main ingredient.

14. The multilayer ceramic capacitor of claim 9, wherein the dielectric ceramic composition comprises at least more than 0.0 to 4.15 mol % of a fourth accessory ingredient, oxides or carbonates including Ba and comprises at least more than 0.0 to 20.0 mol % of a fifth accessory ingredient, oxides or carbonates including at least one element between Ca and Zr, based on 100 mol % of the base material main ingredient.

15. The multilayer ceramic capacitor of claim 9, wherein the dielectric ceramic composition comprises at least more than 0.0 to 4.0 mol % of a sixth accessory ingredient, oxides including at least one element between Si and Al, or glass compounds including Si, based on 100 mol % of the base material main ingredient.

16. The multilayer ceramic capacitor of claim 9, wherein a thickness of the dielectric layer is 0.45 μm or less, and thicknesses of the first and second internal electrodes are 0.45 μm or less.

17. The dielectric ceramic composition of claim 1, wherein the dielectric ceramic composition comprises no magnesium (Mg).

18. The multilayer ceramic capacitor of claim 9, wherein the dielectric ceramic composition comprises no magnesium (Mg).

* * * * *